Figure 1:
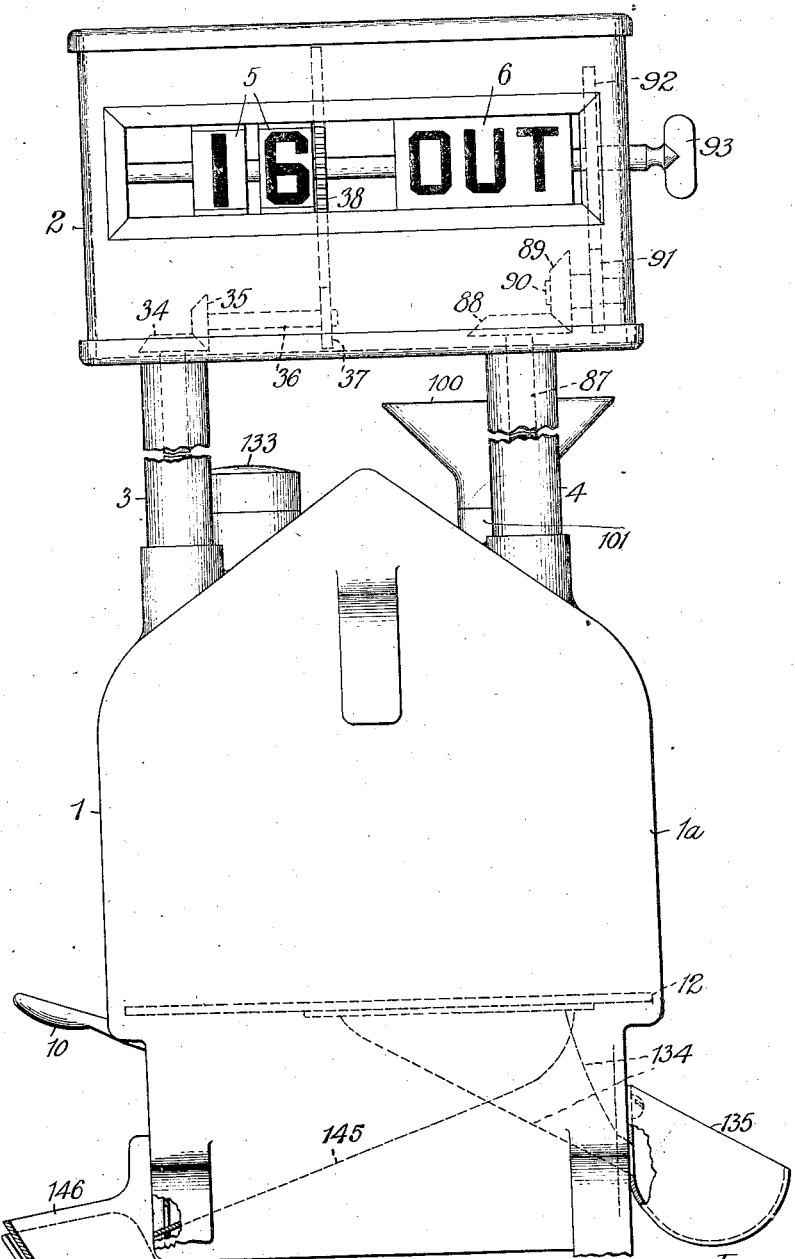

W. G. KIRCHHOFF.
COIN REGISTER.
APPLICATION FILED FEB. 12, 1910.

1,138,385.

Patented May 4, 1915.
11 SHEETS—SHEET 4.

Witnesses:
Leonard W. Novander.
Frank J. Thelen

Inventor
William G. Kirchhoff
By Browns William
Attorneys

W. G. KIRCHHOFF.
COIN REGISTER.
APPLICATION FILED FEB. 12, 1910.

1,138,385.

Patented May 4, 1915.
11 SHEETS—SHEET 5.

Witnesses:
Leonard W. Novander.
Frank J. Thulen

Inventor
William G. Kirchhoff
By Bronson Williams
Attorneys

W. G. KIRCHHOFF.
COIN REGISTER.
APPLICATION FILED FEB. 12, 1910.
1,138,385.
Patented May 4, 1915.
11 SHEETS—SHEET 6.
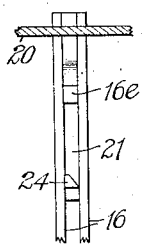
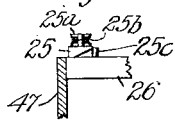
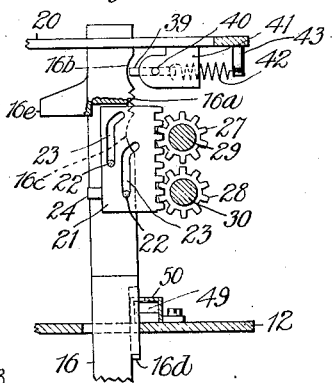
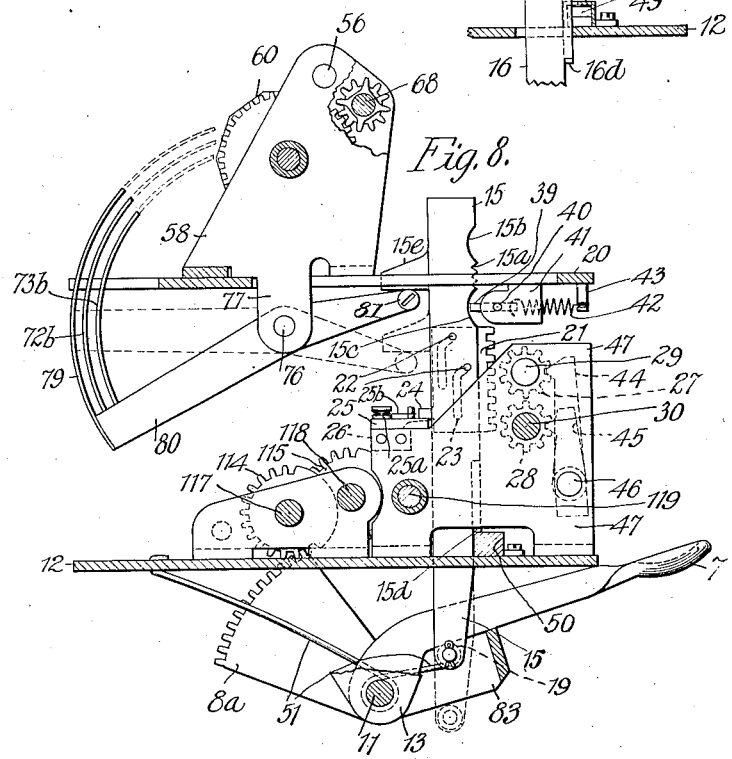
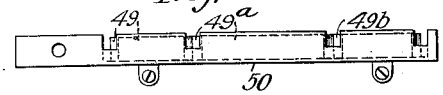
Witnesses:
Leonard W. Novauder
Frank J. Thelen
Inventor
William G. Kirchhoff
By Bruno William
Attorneys.

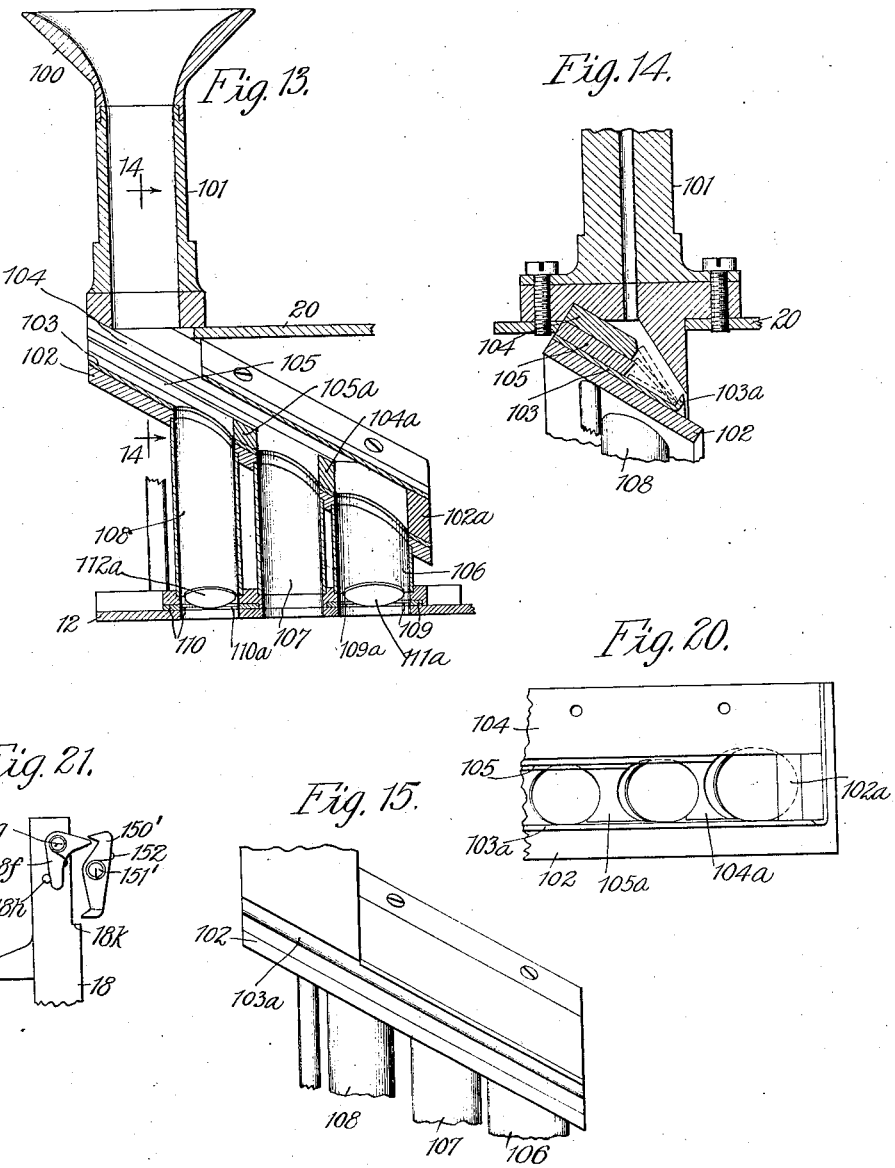

W. G. KIRCHHOFF.
COIN REGISTER.
APPLICATION FILED FEB. 12, 1910.

1,138,385.

Patented May 4, 1915.
11 SHEETS—SHEET 8.

Witnesses:
Leonard W. Novauder
Frank J. Thelen

Inventor
William G. Kirchhoff
By Brown Williams
Attorneys

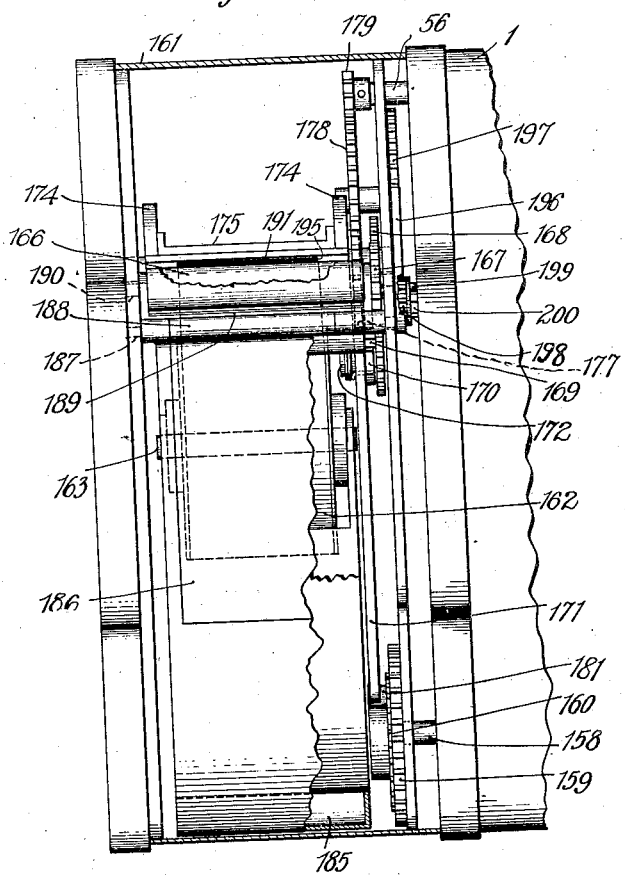

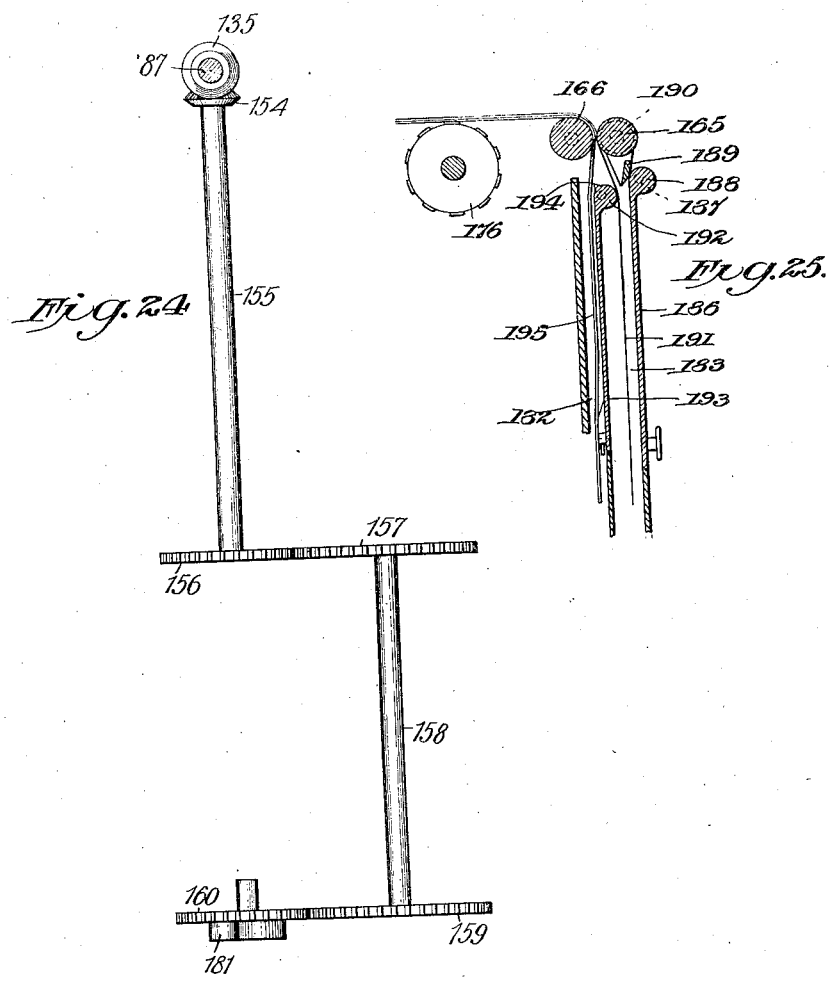

UNITED STATES PATENT OFFICE.

WILLIAM G. KIRCHHOFF, OF BERWYN, ILLINOIS, ASSIGNOR TO THE INTERNATIONAL REGISTER CO., OF CHICAGO, ILLINOIS, A CORPORATION OF ILLINOIS.

COIN-REGISTER.

1,138,385. Specification of Letters Patent. Patented May 4, 1915.

Application filed February 12, 1910. Serial No. 543,440.

*To all whom it may concern:*

Be it known that I, WILLIAM G. KIRCHHOFF, a citizen of the United States, residing at Berwyn, in the county of Cook and State of Illinois, have invented certain new and useful Improvements in Coin-Registers, of which the following is a full, clear, concise, and exact description, reference being had to the accompanying drawings, forming a part of this specification.

My invention relates to an improved form of coin or token registers, and is particularly adapted to receive coins or tokens from the persons passing the register and to deliver them to an attendant only after the coins or tokens have been properly registered upon the registering mechanism.

This register is particularly adapted for use in connection with places of entertainment and passenger cars and it may be used in any connection in which it is desirable for a person to deposit his admission or fare directly into a suitable receptacle and where it is particularly desired to have an attendant register the coin at the same time.

It is an object of my invention to construct a register of the kind just described such that different coins may be dropped into the coin receptacle and be automatically sorted, each coin as it passes to its own receptacle serving to unlock associated mechanism, as a result of which the mechanism is placed in a condition so that the attendant may effect a single operation of the registering mechanism. By the operation of the registering mechanism the coin is withdrawn from its particular receptacle and delivered to the attendant, and at the same time mechanism is operated, which serves to register the coin upon a temporary register and also upon a totalizing register.

It is a further object of my invention to provide means in connection with the coin-sorting mechanism and the register-operating mechanism such that a single admission or fare may be paid by depositing in the coin receptacle a coin of larger value than that required for the admission fare. This releases the operating mechanism in such a way that a single admission or fare is registered, the coin is delivered to the attendant and the change corresponding to the difference between the coin deposited and the person's admission or fare may be delivered from a suitable change receptacle to such person, all by the operation of the coin registering means. Suitable interlocking mechanism is provided so that when the temporary register is being reset it is impossible to operate any of the register-operating means; also that during the operation of any of the register-operating means it is impossible to reset the temporary register. Means are also employed to require the complete operation of one of the coin-registering means through its entire cycle when once its operation is begun.

I also provide in my invention a means for registering admissions or fares not representing cash value, as, for instance, tickets by which the temporary register is advanced, and also a separate totalizing register used only for this purpose. This register-operating means may be operated at any time provided the other register-operating means are in their normal position. Indicators are also provided to indicate the character of the last registration, each registration bringing a corresponding indicator into view, in which position it is retained until the next succeeding registration. The operation of any one of the registering means serves to lock all of the other register-operating means, and thus prevent their being moved from normal position.

My invention also includes mechanism for recording the condition of the registering mechanism by the act of registering an admission or fare.

Figure 2:
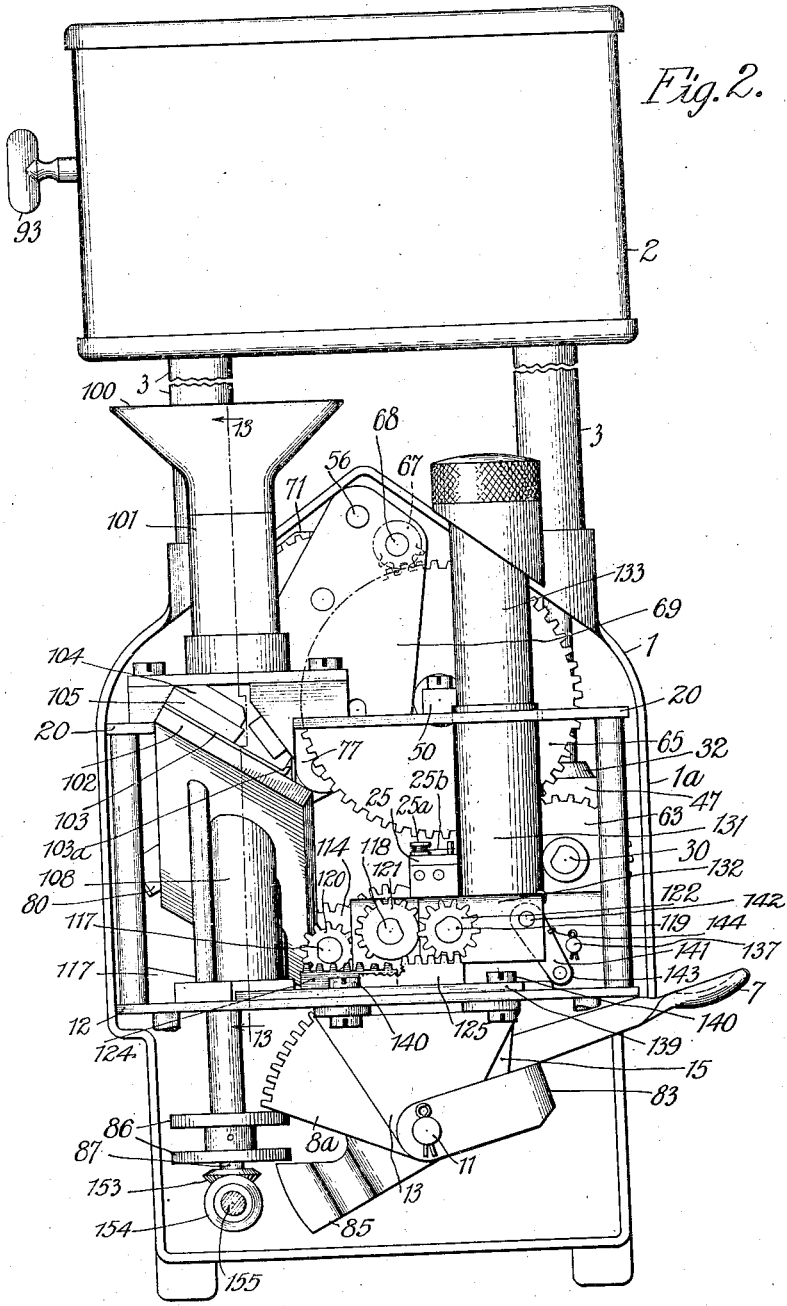
Figure 3:
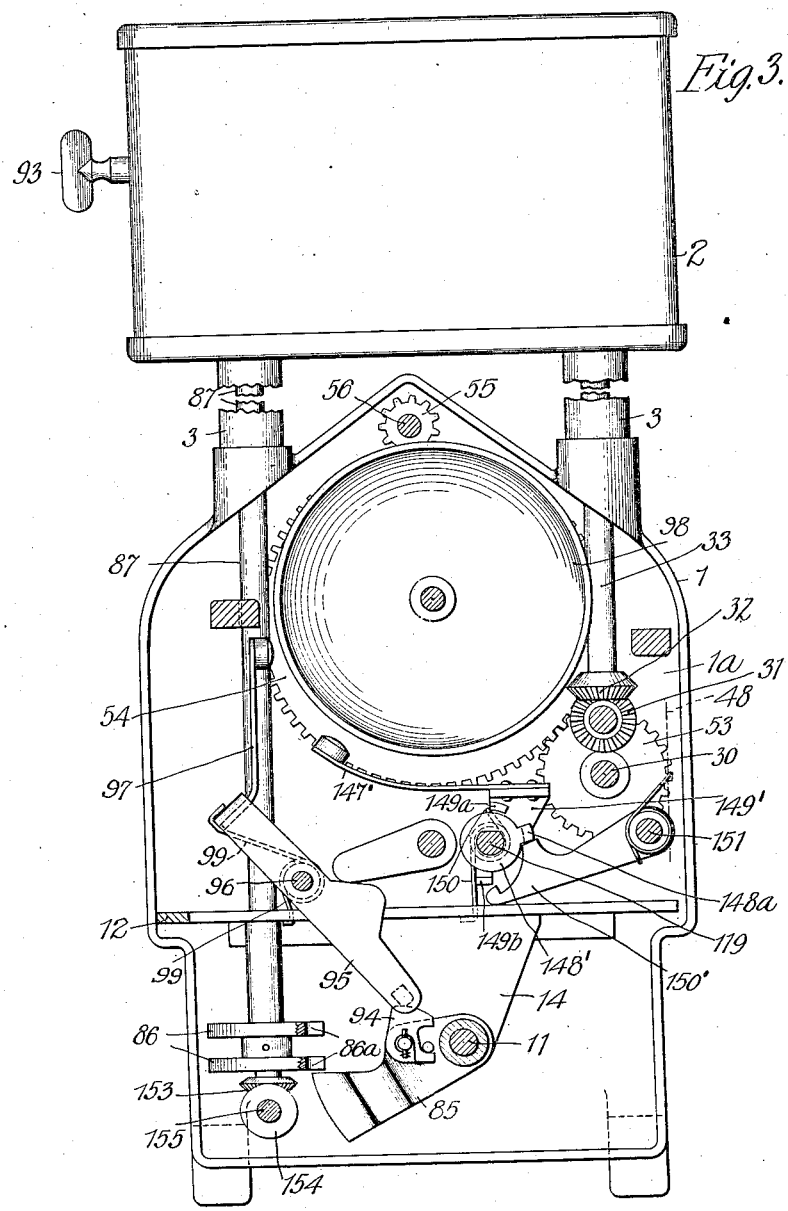
Figure 4:
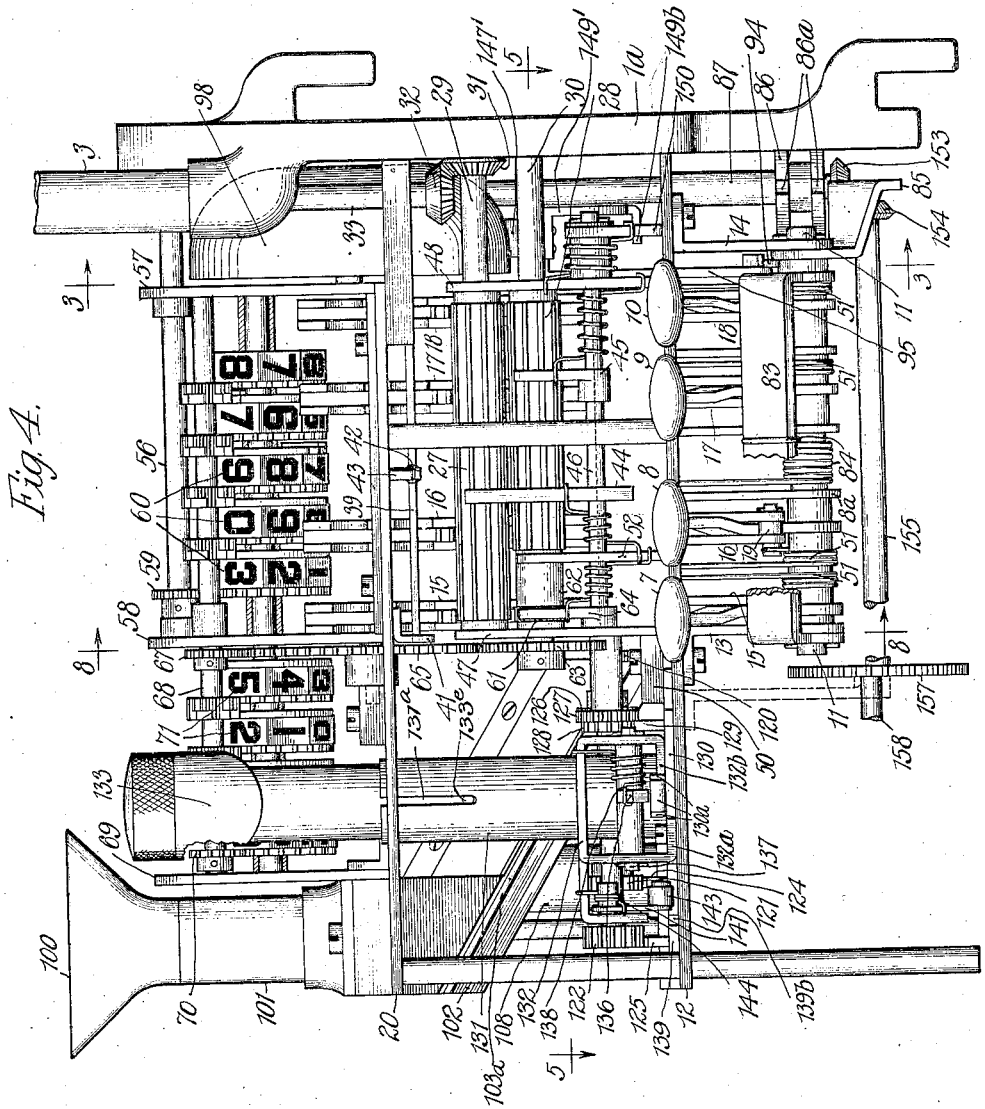
Figure 5:
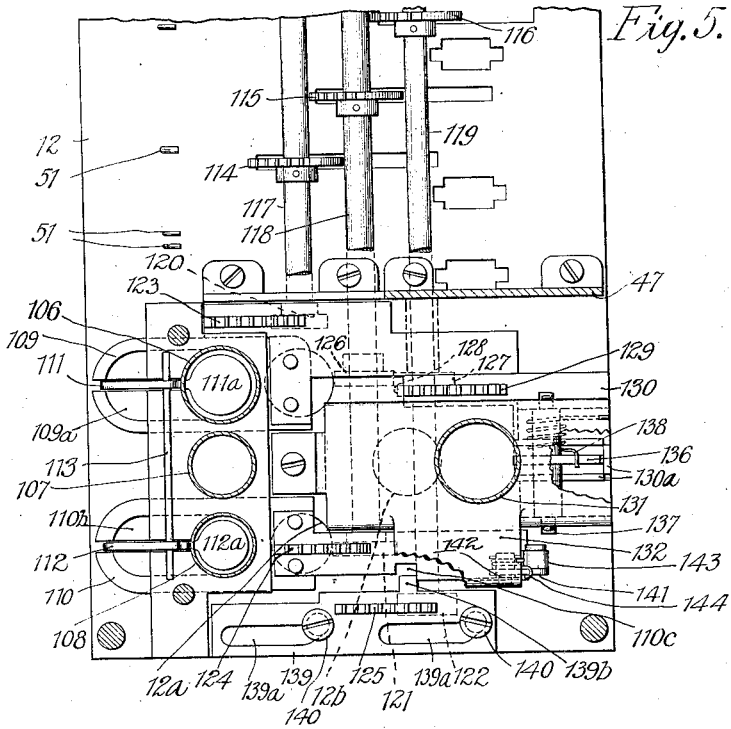
Figure 6:
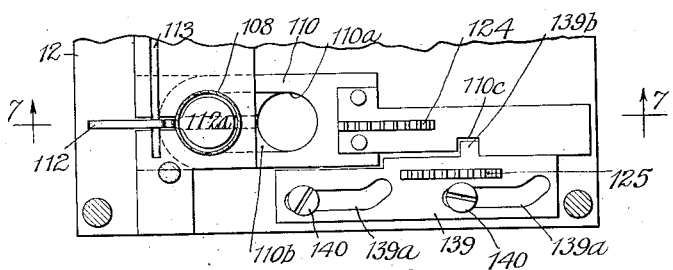
Figure 7:
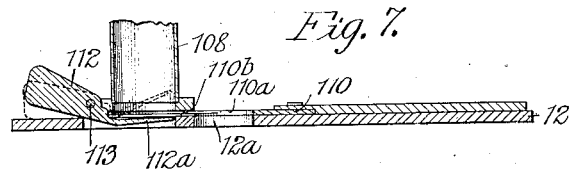
Figure 16:
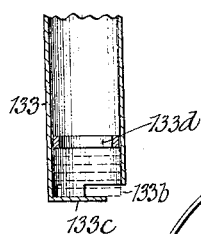
Figure 17:
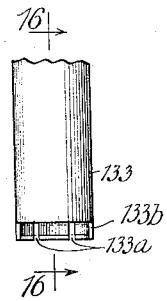
Figure 19:
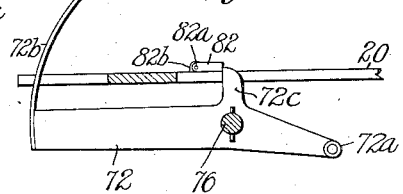
Figure 18:
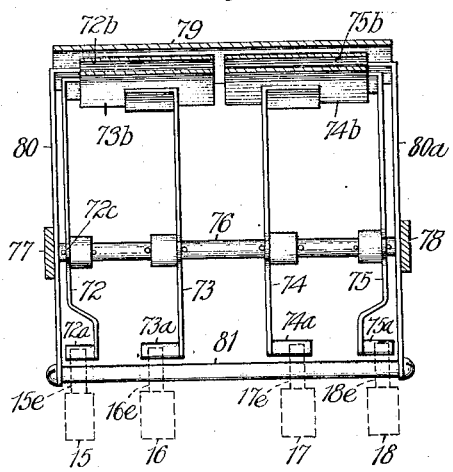
Figure 23:
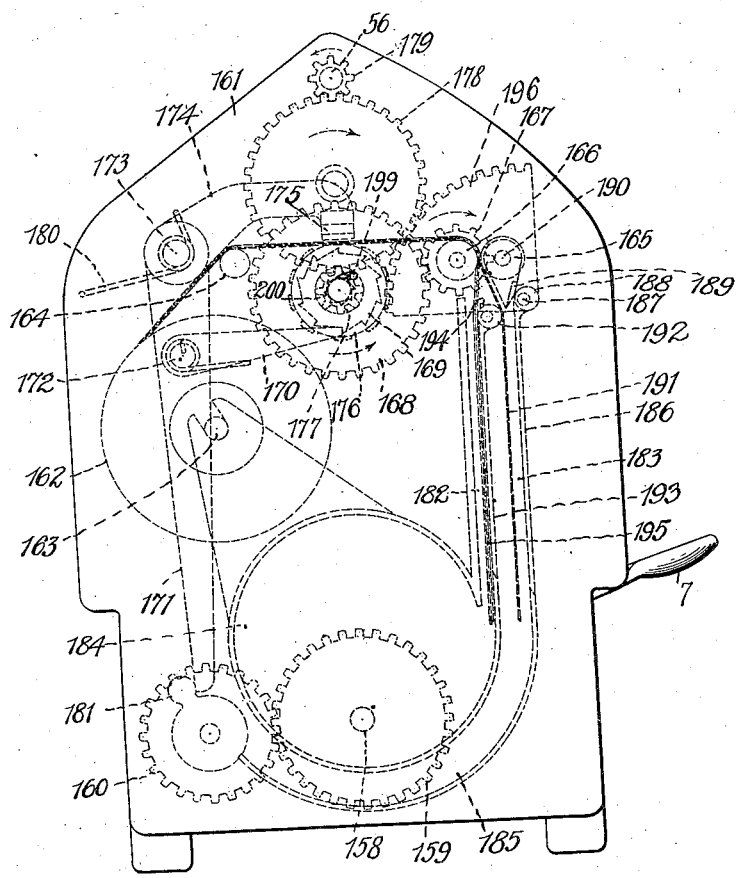

The several drawings illustrating my invention are as follows:

Figure 1 is an end view of my machine assembled. Fig. 2 is an end view of the machine taken from the opposite end to that shown in Fig. 1, in which view the casing normally used to inclose the operating mechanism is removed. Fig. 3 is a vertical sectional view taken along the line 3—3 in Fig. 4. Fig. 4 is a side view of the registering mechanism with the casing of the machine removed. Fig. 5 is a horizontal sectional view taken along the line 5—5 of Fig. 4. In Fig. 5 a portion of the operating mechanism is removed for the sake of clearness. Fig. 6 shows a portion of the mechanism indicated in Fig. 5, in its operated position, the corresponding parts being shown in their normal position in Fig. 5. Fig. 7 is a vertical sectional view, taken along the line 7—7, of the parts shown in Fig. 6. Fig. 8 is a vertical sectional view of the operating mechanism, taken along the line 8—8 in Fig. 4. Fig. 9 is a detail view of one of the operating racks, and shows the means by which any one of the operating mechanisms brings a corresponding rack into engagement with the gearing mechanism used to operate the temporary and totalizing registers. Fig. 10 is a detail view of a latch mechanism shown in Fig. 8 adapted to engage the racks to cause their operation. Fig. 11 is a detail view of a portion of one of the racks, showing the projection formed thereon adapted to engage the controlling mechanism shown in Fig. 10. Fig. 12 is a detail view of a locking mechanism used when any one of the registering mechanisms is operated to prevent the operation of any of the other register-operating mechanisms. Fig. 13 is a vertical sectional view taken along the line 13—13 in Fig. 2, and shows only the coin receptacle and coin-sorting mechanism. Fig. 14 is a vertical sectional view taken along the line 14—14 in Fig. 13. Fig. 15 is a side view of a portion of the coin-sorting mechanism shown in Fig. 13. Fig. 16 is a transverse, vertical sectional view taken through the center of the change receptacle, such view being taken along the line 16—16 in Fig. 17. Fig. 17 is a view in the same position as Fig. 4, of the lower portion of the change receptacle. Fig. 18 is a detail view of the indicator mechanisms used to indicate whether the register is in normal condition and the nature of the last registration. Fig. 19 is a detail view showing the means employed for retaining the last operated indicator in its indicating position. Fig. 20 is a plan view of a portion of the coin-sorting slide. Fig. 21 is a detail view of the mechanism employed in connection with one of the rack bars to prevent its too rapid return from a depressed position to its normal position. Fig. 22 is a side view of the recording mechanism which is disposed at the left hand end of the parts shown in Fig. 4. Fig. 23 is a left hand end view of the parts shown in Fig. 22. Fig. 24 is a detail view of the gearing employed to operate the recording mechanism from the register resetting mechanism. Fig. 25 is a detail view of devices operated by the doors of the recording mechanism.

Similar numerals refer to similar parts throughout the several views.

As shown in Figs. 1, 2 and 3, the register consists essentially of two portions, the lower portion 1 of which may be considered to be the register-operating mechanism, while the upper portion 2 may be considered to be the temporary register mechanism. The portion 2 is supported from the portion 1 by columns 3 and 4 in such a manner as to bring the temporary indicators 5 and 6 into convenient view of the passengers, while the operating portion 1 is at the same time in a convenient position to be operated by the attendant when occupying a proper position to receive the coins from the persons passing the register.

As shown in Fig. 4, the operating mechanism consists of a plurality of operating levers 7, 8, 9 and 10 so disposed that the outer cup-shaped ends may be conveniently depressed by the attendant. The levers 7, 8, 9 and 10 are pivoted upon a common rod 11, as shown in Fig. 2, which is supported from the plate 12 by brackets 13 and 14. The levers 7, 8, 9 and 10 engage on their under sides rollers secured to the lower ends of the rack bars 15, 16, 17 and 18, as shown for the lower rack bar 16 at 19. The rack bars 15, 16, 17 and 18 extend upward vertically through the plates 12 and 20, and are slidable in such plates. Each of the rack bars has slidably mounted upon it, between its two side members, a rack 21, as indicated for the rack bar 16 in Fig. 9. The rack 21 is held in place between the side members of the rack bar 16 by means of pins 22 secured to the rack bar 16, which pass through slots 23, 23 in the rack 21. The slots 23, 23 extend vertically in the rack 21, and at their upper ends have parallel offset portions, as a result of which motion of the rack 21 relatively to the rack bar 16 is such as to maintain the teeth formed on the right-hand edge of the rack 21 parallel with the edge of the rack bar 16. When in its normal position the rack 21 is so disposed that the pins 22, 22 lie in the upper ends of the slots 23, 23, as indicated in Fig. 8, in which position the rearwardly extending projection 24 formed on the rack 21 rests above the latch 25 pivotally supported upon a bar 26 extending longitudinally of the machine at the rear of the rack bars 15, 16, 17 and 18. As a result of the construction described, when the rack bar 16 is moved downward by the operation of the lever 8, the projection 24 engages the top of the latch 25, and thus the rack 21 is prevented from being moved downward by the motion of the rack bar 16. This continues as long as the pins 22, 22 are in the parallel offset portions formed at the upper ends of the slots 23, 23, and as soon as the pins 22, 22 enter the vertical portions of such slots, the rack 21 has been moved out from between the side members of the rack bar 16 a sufficient distance to clear the latch 25 and to cause the teeth of the rack 21 to engage the gears 27 and 28 secured to the shafts 29 and 30, respectively. The shaft 29 carries at its right-hand end a bevel gear 31 meshing with a similar bevel gear 32 carried by the vertical shaft 33 extending upward through the column 3 to the temporary indicating mechanism contained in the portion 2 of the register. The shaft 33 at its upper end carries a bevel gear 34 engaging a similar bevel gear 35 secured to a shaft 36, to the right-hand end of which a spur gear 37 is secured. The spur gear 37 engages a gear 38 secured to the units wheel of the temporary register, and, as a result, when the gear 27 is rotated by the downward motion of the rack 21, the temporary register is advanced. Each of the rack bars 16, 17 and 18 is similarly constructed, the only difference being that the rack 21 operated by the rack bar 16 by means of the lever 8 is so constructed that after the pins 22 reach the lower ends of the slots 23, continued motion of the rack bar 16 serves to rotate the gears 27 and 28 an amount sufficient to advance the temporary register one unit, while the corresponding rack carried by the rack bar 18 has formed therein shorter vertical slots, as a result of which by the operation of the lever 10 a greater amount of motion is imparted to the rack vertically, and the gears 27 and 28 are therefore caused by the operation of the rack bar 18 to rotate a sufficient amount to advance the temporary register two units. In other words, the rack bar 16 is depressed when it is desired to register one admission, and the rack bar 18 is depressed when it is desired to register two admissions. The lever 9 and rack bar 17 effect an operation of the temporary register 5 which is identical with that resulting from the operation of the lever 8. The difference in the results secured by these two mechanisms will be described later.

Each of the rack bars is serrated on its right-hand edge, as shown at 16ª for the rack bar 16, which serrations are adapted to engage the edges of the safety bar 39 pivoted at 40 in brackets 41 supported from the under face of the plate 20. A spring 42 extending from the right-hand edge of the bar 39 to the post 43 carried by the plate 20 serves to normally maintain the bar 39 in horizontal position, which position may be assumed either when the rack bar 16 is in its depressed position or when in its normal position, suitable clearances being cut in the right-hand edge of the bar, as indicated at 16ᵇ and 16ᶜ. This construction provides that when the rack bar is moved downward the bar 39 engages the serrations 16ª until the clearance 16ᵇ is brought opposite such bar, when the bar assumes its horizontal position, thus permitting upward motion of the rack bar, during which motion the serrations 16ª again engage the safety bar until such rack bar reaches its normal position, at which time the clearance 16ᶜ is brought opposite the safety bar, and it again assumes its horizontal or normal position. It is to be understood that the single safety bar 39 serves the purpose just described for all of the rack bars 15, 16, 17 and 18 when any one of such rack bars is depressed, the result being that when a rack bar is depressed it must complete its downward motion before it can be moved upward, and when started on its upward motion it must complete such motion before it can be again moved in a downward direction. In other words, if the operation of one of the levers 7, 8, 9 or 10 is begun, it must be continued through its entire cycle of operation. The safety bar 39 and the coöperating serrations constitute what is commonly known as a "full stroke" mechanism.

When the rack bar 16 moves upward, the rack 21 associated therewith remains at rest, owing to the engagement by the gears 27 and 28 of the pawls 44 and 45 pivoted on the rod 46 extending between the brackets 47 and 48 supported from the upper surface of the plate 12. As a result, the pins 22, 22 move upward in the slots 23, 23 until the offset portions are reached, at which time the rack is moved to the left, away from the pinions 27 and 28, and the projection 24 is moved under the right-hand end of the latch 25, after which, by the engagement of the pins 22, 22 with the upper ends of the slots 23, 23, the rack 21 is moved upward so as to bring the projection 24 into engagement with such latch 25. The lower surface of the end of the latch 25 is beveled, as indicated in Fig. 10, and the upper surface of the projection 24 is beveled so as to coöperate with such lower surface, as a result of which, when the projection 24 engages the latch 25, the latter is moved around upon its pivot 25ª against the action of the spring 25ᵇ, which normally serves to hold the latch 25 against a pin 25ᶜ in such a position that it engages the lower surface of the projection 24 when the rack bar 16 is moved downward. Each of the racks carried by the rack bars 15, 16, 17 and 18 is caused to engage the gears operated thereby in a manner similar to that just described for the rack 21.

The rack bar 16 is narrower at its lower end than it is at its upper portion, and a beveled shoulder 16ᵈ is formed between the two portions, which shoulder is adapted to engage the beveled upper edges of the blocks 49, 49ª, 49ᵇ mounted in the casing 50 upon the plate 12 in such a position as to normally lie just below the beveled shoulders formed on the different rack bars. The casing 50 and the several locking bars 49, 49ª and 49ᵇ are shown in detail in Fig. 12. It is to be understood that the beveled shoulder formed on the rack bar 15 engages the beveled left-hand corner of the locking bar 49, that the beveled shoulder formed upon the rack bar 16 engages the beveled adjacent corners of the locking bars 49 and 49ª, that the beveled shoulder on the rack bar 17 engages the adjacent beveled corners of the locking bars 49ª and 49ᵇ, and that the beveled shoulder on the rack bar 18 engages the right-hand beveled corner of the locking bar 49ᵇ. The locking bars 49, 49ᵃ and 49ᵇ are free to slide in the casing 50; but in whatever position disposed they are in proper position to be engaged as described by the beveled locking shoulders of the rack bars, as a result of which when any rack bar is depressed it moves the locking bars in the casing 50 in such a way as to completely fill the casing longitudinally, and thus prevent the operation of another of the rack bars until the first rack bar is returned to its normal position.

A spring 51, shown in connection with the rack bar 15, is provided to raise such rack bar to its normal position when the corresponding lever 7 is raised by means to be described. A similar spring is provided for each of the other rack bars 16, 17 and 18.

The shaft 30 to which the gear 28 is connected is supported by the plates 48 and 52 from the top of the plate 12, and this shaft has secured at its right-hand end a gear 53 supported from the end wall 1ᵃ of the casing of the operating mechanism. The gear 53 meshes with a second gear 54, also supported from the end wall 1ᵃ, and the gear 54 meshes with a pinion 55 secured to the right hand end of the shaft 56, shown in Fig. 4 as supported by the plates 57 and 58 from the upper surface of the plate 20. The shaft 56 has secured near its left-hand end a pinion 59 adapted to drive the units register wheel of the totalizing register 60 used to register the total number of cash admissions received. As a result of the construction just described, when any one of the rack bars 16, 17 or 18 is actuated, at the same time that the temporary register is advanced, it will be seen that the totalizing register 60 is also advanced a corresponding amount.

The rack bar 15 by its operation serves to rotate the gear 27 in the manner described above for the operation of the rack bar 16, so as to advance the temporary register one unit, but instead of engaging the gear 28, it engages a similar gear 61, shown in Fig. 4 as supported between the plates 47 and 52 from the upper surface of the plate 12. A boss 62 carried by the plate 52 serves to support the left-hand end of the shaft 30 and the right-hand end of the shaft forming the bearing of the gear 61, to the left-hand end of which latter shaft a gear 63 is secured. A pawl 64 is provided to maintain the gear 61 in any position to which it is moved by the rack bar 15.

As shown in Fig. 2, the gear 63 meshes with an idler gear 65 supported by a bracket 50 from the top of the plate 20, such gear 65 meshing with the pinion 67 secured to one end of the shaft 68, shown in Fig. 4 as supported between the plates 58 and 69 from the upper surface of the plate 20.

The shaft 68 has rigidly secured to it near its left-hand end a gear 70 meshing with the units register wheel of the totalizer 71, which totalizer is adapted to register the total number of tickets or other non-cash admissions received by the attendant. As a result of the construction just described, when the rack bar 15 is operated it advances the temporary register one indication, and also advances the totalizing register 71 one unit.

The rack bars 15, 16, 17 and 18 have extending to the left therefrom, as indicated in Figs. 8 and 9, projecting arms 15ᵉ, 16ᵉ, 17ᵉ and 18ᵉ, which project above rollers 72ᵃ, 73ᵃ, 74ᵃ and 75ᵃ supported by the lower ends, as shown in Fig. 18, of the levers 72, 73, 74 and 75 pivotally mounted upon the rod 76 supported by brackets 77 and 78 extending below the lower surface of the plate 20, as shown in Fig. 8. At their other ends the levers 72, 73, 74 and 75 carry indicator targets 72ᵇ, 73ᵇ, 74ᵇ and 75ᵇ, the supports of such targets being so disposed that by the operation of any one of such levers by the corresponding rack bar the target may be brought up into view, as indicated in dotted lines in Fig. 8. These targets carry suitable indications upon them to designate the character of the admission registered by the operation of the corresponding rack bar, and are visible through a suitable aperture in the casing of the operating mechanism 1.

A common indicator 79 is pivotally supported outside of the indicator targets referred to, by means of lever arms 80 and 80ᵃ, from the shaft 76, and at their other ends are joined by a rod 81 extending under all of the projections 15ᵉ, 16ᵉ, 17ᵉ and 18ᵉ. As a result of this construction, when any one of the rack bars is operated, the common indicator target 79 is moved into position to be seen by the passenger and indicates that the operating mechanism is not in its normal condition. When the operated rack bar returns to normal position, the indicator 79 also returns to normal position, but the individual indicator target operated by such rack bar is retained in operated position to indicate the nature of the last registration. This is accomplished by the mechanism indicated in Fig. 19. Each of the levers 72, 73, 74 and 75 has extending upwardly therefrom an arm, as indicated for the lever 72 at 72ᶜ in Fig. 19. These upwardly extending projections are adapted to project above the top of the plate 20 when the levers carrying them are operated, and to the right of a latch bar 82 pivoted at 82ᵃ to brackets 82ᵇ carried by the upper surface of the plate 20. The upwardly projecting arms referred to and the latch bar 82 are so disposed that the operation of any one of the levers before it is engaged by such latch bar raises it sufficiently to disengage the lever previously retained thereby.

A U-shaped frame 83 is pivotally supported upon the rod 11 and so disposed as to lie below the levers 7, 8, 9 and 10. A spring 84 serves to hold the U-shaped frame 83 up against such levers. The right-hand end of the frame 83 has rigidly secured thereto a locking member 85 which extends in a direction opposite to the lever 10 and is formed at its outer end to engage locking notches 86ª formed in a collar 86 carried by the lower end of the resetting shaft 87, which extends upwardly through the column 4 into the temporary register 2. The shaft 87 has secured to its upper end a bevel gear 88 meshing with a similar bevel gear 89 carried by a shaft 90, to which is also secured a spur gear 91 meshing with a similar spur gear 92 secured to the resetting key 93. The resetting key 93 is secured to the mechanism of the temporary register 2 in a manner well known in the art, so that by its rotation the register wheels 5 may be moved to zero when so desired. This resetting operation rotates the shafts 90 and 87, and therefore the collar 86, as a result of which during the resetting operation no one of the levers 7, 8, 9 and 10 may be operated, since the locking arm 85 engages the lower face of the collar 86 for all positions of the resetting mechanism except in its normal position, for which the notches 86ª are in position to be entered by the locking arm 85. By its engagement with the notches 86ª, the locking arm 85 prevents resetting of the temporary register when any one of the levers 7, 8, 9 and 10 is not in its normal position.

As shown in Fig. 3, the locking member 85 has pivotally secured thereto a spring dog 94 adapted to engage the lower end of a lever 95 pivotally supported above the plate 12 by a rod 96. The upper end of the lever 95 has secured thereto a spring hammer 97 adapted to strike a gong 98. As a result, when the locking arm 85 is operated by the motion downward of any one of the levers 7, 8, 9 and 10, the dog 94 moves the lever 95 around to the left on its pivot until the lever is released from the dog, at which time the spring 99 moves the lever around to the right and causes the hammer 97 to strike the gong 98 to indicate that a coin has been registered. Upon the return stroke of the locking bar 85, the dog 94 moves upon its pivot to pass the lower end of the lever 95 to again assume an operative position relatively to the same.

In connection with my register I also provide a coin sorting mechanism consisting, as shown in Figs. 2 and 4, in a hopper 100 so conformed as to direct coins deposited therein into the tube 101, which is provided with a rectangular passageway, as indicated in Figs. 13 and 14, adapted to receive the largest coin to be handled by the device. As shown in the figures just referred to, the lower end of the tube 101 is so disposed as to deliver the coins into the coin-sorting mechanism 102, in which the coins assume different positions, depending on their size, as indicated in Fig. 14, the largest coin resting against the flange 103ª formed upon the plate 103, and also upon the edge of the upper bar 104, while a smaller coin rests upon the flange 103ª and upon the edge of a bar 105 below the bar 104, and a still smaller coin rests directly upon the plate 103. As indicated in Fig. 13, the plate 103 and the bars 104 and 105 have formed in them openings over the upper ends of the tubes 106, 107 and 108 to receive the coins of largest size, intermediate size and smallest size, respectively. For example, if the coins to be handled are five-cent nickels, pennies and ten-cent pieces, the five-cent pieces would be engaged by the bar 104 and pass down the sorting mechanism and be delivered into the tube 106. The pennies would rest upon the bar 105 and pass down the sorting mechanism into the tube 107, while the dimes would rest directly upon the plate 103 and be delivered by the sorting mechanism into the tube 108. The several coin tubes and the sorting mechanism are supported from the plates 12 and 20 as indicated. It will be noticed by reference to Figs. 13 and 20 that the bars 104 and 105 are so conformed that they constitute stops for preventing motion of the different coins beyond their proper tubes 108 and 107, that is the bar 105 constitutes a stop as shown at 105ª in Fig. 20 to prevent coins of the smallest size, for example dimes, from passing beyond the receiving tube 108; the bar 104 has formed thereon a stop 104ª, as shown in Fig. 20 which serves to engage coins of intermediate size, for example pennies, and prevent them from passing beyond their receiving tube 107; and coins of the largest size, for example five-cent pieces, are prevented from passing beyond their tube 106 by the end wall 102ª of the sorting mechanism. By this arrangement the sorting mechanism provides means for positively stopping and directing the coins to be sorted into their proper receiving receptacles.

Means are provided in connection with the tubes 106 and 108 for removing the coins therein deposited, such removing means consisting in slides 109 and 110 supported on the upper surface of the plate 12 below the lower ends of the tubes 106 and 108. Each of the slides 109 and 110, as shown for the slide 110 in Fig. 7, has formed therethrough an opening 110ª adapted to receive a coin from the corresponding tube when it is in position below the lower end thereof. Located in the lower end of each of the tubes 109 and 110 is a lock 111 and 112 adapted to prevent operation of the corresponding slide unless the lock is first released by depositing a coin in the tube. Each lock consists of a circular plate 111ª, 112ª disposed in a substantially horizontal position and having a flat, vertically-disposed, rearwardly extending portion by means of which such locks are pivoted upon the common rod 113. Slots are provided in the slides 109 and 110 to accommodate the vertically disposed portions of the locks 111 and 112. When in their normal positions the rear edges of the circular portions of the locks engage the rear edges of the openings 109ª and 110ª, and thus prevent motion of the slides 109 and 110 to the right, as shown in Figs. 5, 6 and 7. Suitable stops prevent motion to the left of such slides when in this position. When a coin is deposited in one of the tubes, as, for example, in the tube 108, it rests upon the circular portion of the lock 112, and since the lock is properly counterbalanced so that the weight of the coin will rotate such lock on its pivot, the lock is rotated to the right and the coin enters the opening 110ª in the slide 110, for which position the circular portion of the lock 112 is disposed entirely below the slide 110 in a suitable clearance opening formed therefor in the plate 12. This position of the lock releases the slide 110, which may then be moved to the right by means to be described, and the coin contained in the opening 110 drops through an opening 12ª, from which it is conducted to a suitable coin receptacle, as will be described. The portion of the slide 110ᵇ engaging the coin is made thinner than the body of the slide in order that but one coin may be removed at a time from the tube 108 if several coins are contained therein. This is to provide that the body portion of the slide may be sufficiently strong, while at the same time the portion of the slide engaging the coins may be slightly thinner than such coins.

The levers 8, 9 and 10 have secured thereto sectors, as shown at 8ª for the lever 8 in Figs. 2 and 8, which sectors engage, respectively, the gears 114, 115, and 116, shown in Fig. 5, which gears are secured to the shafts 117, 118 and 119 supported in suitable bearings from the upper surface of the plate 12. The shafts 117, 118 and 119 have secured to their ends nearest the observer, as shown in Fig. 2, the pinions 120, 121 and 122, respectively, which pinions are adapted to engage the racks 123, 124 and 125, respectively. The racks 123 and 124 are secured as indicated in Fig. 5 to the slides 109 and 110, from which it follows that when either the lever 8 or the lever 9 is depressed, the corresponding slide 109 or 110 is moved to the right to deliver a coin from the corresponding coin tube through the opening provided therefor in the plate 12, which operation is only possible if the coin is in one of the tubes to release the locking mechanism above described.

The shaft 118 also carries rigidly secured thereto, between the pinion 121 and the gear 115, a pinion 126 meshing with a similar pinion 127 loosely mounted on the shaft 119. The pinion 127 has rigidly secured thereto another pinion 128 engaging a rack 129 carried by the slide 130. The slide 130 is provided to make change in the event of a coin of larger denomination being deposited than is required for the admission fee. This coin-changing mechanism is constructed as follows:

The slide 130, as shown in Figs. 4 and 5, is supported by the upper surface of the plate 12 immediately below the tube 131, the lower end of which is supported by the rectangular bracket 132 from the upper surface of the plate 12. The bracket 132 is secured by means of a flange portion 132ª, the right-hand edge of which is engaged by the slide 130, which therefore serves in part to maintain the slide 130 in proper position. A similar flange 132ᵇ is so formed on the bracket 132 as to lie above the slide 130 in such a position as to keep it in place upon the plate 12. The slide 130 has secured thereto between the flanges 132ª and 132ᵇ a locking member 130ª composed of vertically extending side and end members. The tube 131 is adapted to receive the change receptacle 133, which in the apparatus shown is constructed to contain five-cent nickels. The lower end of the tube 133 is slotted, as indicated in Fig. 17, at 133ª to permit the passage therethrough of the side members of the lock 130ª. A portion of the side wall of the tube 133 is cut away as indicated at 133ᵇ in Fig. 16, and a bottom portion 133ᶜ is provided, extending somewhat more than half way across the lower end of the tube 133 to retain the nickels contained in the tube in place. A washer 133ᵈ is provided in the tube 133 and normally rests upon the nickels contained therein. The cut-away portion of the side wall is of just sufficient height so that one nickel at a time may be moved from the lower end of the tube by the engagement therewith of the front ends of the side members of the lock 130ª as they pass through the slots 133ª. The slide 130 is cut away, as indicated in Fig. 5, so that the portion adapted to engage the nickel as it is removed from the tube 133 is practically flush with the forward ends of the side members of the lock 130ª, as a result of which, when the slide 130 is moved to the left by means of the operation of the shaft 118 and the pinions 126, 127 and 128 operated thereby, the nickel that is removed from the lower end of the change tube 133 drops in front of the portion of the slide 130 adapted to engage it and is moved thereby over an opening 12ᵇ in the plate 12, through which it drops into a suitable chute 134, indicated in Fig. 1, and passing down this chute it enters a suitable receptacle 135 convenient of access to the person who has just paid his admission and is waiting for his change. When the last nickel is removed from the change tube, the washer 133ᵈ drops upon the bottom 133ᶜ of the tube, but owing to the fact that it is of greater thickness than the nickels, it cannot be removed through the opening in the lower end of the side wall of the tube, and therefore if another operation of the slide 130 be attempted the forward ends of the side members of the lock 130ᵃ engage the washer 133ᵈ and prevent motion of the slide 130. When the tube 133 is placed in the tube 131 it engages the lower left-hand end, as shown in Fig. 5, of the locking dog 136 pivotally supported upon a rod 137 from the bracket 132. When the tube 133 is removed from the tube 131, the dog 136 is rotated by means of the spring 138 so that its right-hand end, as shown in Fig. 5 moves downward between the side members of the lock 130ᵃ in position to engage the end member of such lock, for which condition motion to the left of the slide 130 is prevented. From the above it appears that the shaft 118 and the lever 9 adapted to operate the same can only be actuated to advance the registering mechanism when a properly filled change receptacle is in place above the slide 130 to deliver to the person who has just paid his admission the proper change. The tube 133 carries a pin 133ᵉ adapted to engage a slit 131ᵃ formed in the tube 131, in order to properly aline the two tubes.

From the description above it will be understood that when the shaft 118 is operated, which can only be done when a coin or token of proper value is deposited in the tube 108, the slide 110 is moved to the right, as shown in Fig. 5, to deliver to the attendant the coin deposited by the person who has just paid his admission, and at the same time the slide 130 is moved to the left to deliver to such person the proper change.

The rack 125 engaged by the pinion 122 is carried by a slide 139 secured to the upper surface of the plate 12 by means of screws 140. The screws 140 pass through slots 139ᵃ in the slide 139, which slots, while parallel with the sides of the slide for the greater portion of their length, have obliquely disposed portions at their right-hand ends, as a result of which, when the slide 139 is moved by means of the pinion 122 and rack 125 from the position shown in Fig. 5 to the position shown in Fig. 6, the first part of its motion is both lateral and longitudinal, while the remaining portion of its motion is only longitudinal and in the same direction as the several other slides described. By its lateral motion the projecting lug 139ᵇ formed on the upper edge of the slide 139, as shown in Figs. 5 and 6, is caused to engage a notch 110ᶜ formed in the lower edge of the slide 110, and continued motion of the slide 139 therefore serves to move the slide 110 with it to the right. In order that the slide 110 may be moved by the operation of the shaft 119, the pinion 122 and the rack 125, the pinion 121, adapted to engage the rack 124, is mutilated, as indicated in Fig. 2, so that it normally does not engage the rack 124, and that the rack 124 may be moved to the right without engaging such pinion. When, however, the shaft 118 is rotated, the pinion 121 engages the rack 124 to move the slide 110 as above described. The slide 110 is therefore normally laterally free from the operating mechanism, and to maintain such slide in its left-hand position a lever 141 pivoted to the bracket 132 at 142 is provided, which carries a roller 143 at its lower end to engage the right-hand end of the slide 110 as a result of the operation of a spring 144. The parts are so proportioned that the lower surface of the roller 143 occupies a position below the top of the slide 110 in which position it is held by the lever 141 under the action of the spring 144 and thus the slide 110 is normally maintained in its left hand position by the action of such spring although obviously when the pinion 121 is rotated to the left as indicated in Fig. 2, roller 143 is raised against the action of the spring 144 by its engagement with the right hand end of the slide 110, as a result of which said slide may be moved to the right to operate the mechanism as described. In this way accidental displacement of the slide 110 is prevented and it is maintained in proper position to be engaged and properly actuated by the mutilated pinion 121.

From the above description it will appear that for a particular use of the registering mechanism, as, for example in connection with street cars, the passenger may deposit, for example, either a five-cent nickel or a ten-cent piece, or perhaps, by mistake, a penny. If he deposits a penny, it passes through the coin-sorting mechanism described into the tube 107, and dropping through the plate 12, it enters the chute 134, thus into the receptacle 135 and back to the passenger. If the passenger deposits a five-cent nickel, it passes down through the coin-sorting mechanism and into the tube 106, operating the locking mechanism 111, and thus permitting operation only of the lever 8, which serves, as above described, to remove the five-cent nickel from the tube 106 and to deliver it from the machine and at the same time to advance the totalizing register 60 and the temporary register 5 one unit. If a passenger deposits a ten-cent piece, it passes down through the coin-sorting mechanism into the tube 108 and operates the locking mechanism 112 so that the slide 110 may be actuated. This may be accomplished in either one of two ways. If the passenger desires to pay two fares the lever 10 is operated, which by the actuation of the shaft 119 operates the slide 139, and thereby the slide 110 is operated, with the result that the ten-cent piece is delivered from the tube 108 as above described, and at the same time the temporary register 5 and the permanent register 60 are advanced two units each. If, on the other hand, the passenger wishes to pay a single fare upon depositing a ten-cent piece, the lever 9 is operated, instead of the lever 10, and therefore the shaft 118 is operated to actuate the slide 110 directly, and also the slide 130, as a result of which, at the same time that the ten-cent piece is delivered from the tube 108, a five-cent nickel is delivered from the tube 133.

As indicated in Fig. 1, the chute 134 is provided to receive pennies from the tube 107 or five-cent pieces from the opening 12$^b$, and the pennies and five-cent nickel thus delivered are conveyed by the chute 134 into the receptacle 135, which is conveniently accessible to the person who is to receive them. A second chute 145 is provided to receive coins or tokens delivered from the tubes 106 and 108 to convey them to a receptacle 146 disposed on the operating side of the register in a position readily accessible to the operator. The receptacle 146 is provided with a hinged bottom 147 pivoted to the bottom of the register at 148 and normally held in a position to close the bottom of the receptacle by a spring 149. The bottom 147 has secured to its under side a handle 147$^a$ adapted to be engaged by the fingers of the attendant when he wishes to remove the coins from the receptacle 146. The bottom 147 is extended upward at its ends to form continuations of the fixed sides of the receptacle when the bottom is depressed but the front wall of the bottom 147 is cut away as indicated, as a result of which when the attendant places his fingers in the handle 147$^a$ and presses inward the bottom is depressed and the coins contained in the receptacle are dumped into the palm of his hand. The spring 149 serves to return the bottom 147 to its normal position after the handle 147$^a$ is released. It is to be understood that if the passenger pays his fare by means of a transfer, the coin-sorting mechanism is not employed and the lever 7 is operated, the result being, as above described, that the temporary register 5 and the permanent register 71 are each advanced one unit, the mechanism involved in this operation being in no way controlled by the coin mechanism.

It is to be understood that the operation of the mechanism is identical if used in other connections than upon street cars, as, for example, if used in places of amusement to receive the admission fees, the only difference being that the transfer lever would be used for registering free tickets or other non-cash admissions, if desired, while the coin or token registering keys would be employed for registering coins or tokens of different amount deposited as admission fees in the registering machine.

It is to be understood that my invention is equally applicable to the use of coins of legal value or tokens made and given arbitrary value by the users of the registering machine, as is often done by concerns who desire to have some medium of admission in various connections, instead of money.

The operation of the lever 10, which serves to register a plurality of units of value or a plurality of admission fees by the operation of the shaft 119, operates a second gong hammer 147' by means of the mechanism indicated in Fig. 3. When the lever 10 is depressed, the gong hammer 97 is actuated, as above described, to cause a ringing of the gong, and at the same time by the rotation of the shaft 119 around to the left, as shown in Fig. 3, the collar 148' rigidly secured to such shaft is rotated to the left until a projecting lug 148$^a$ formed on the collar 148' and extending away from the observer, as shown in Fig. 3, engages a lug 149$^a$ extending toward the observer into the path of the lug 148$^a$ from the plate 149' loosely mounted upon the shaft 119 in proper position to support the hammer 147'. A spring 150 tends to maintain the hammer 147' in the position indicated, and when the shaft 119 is rotated around to the left after the engagement of the lugs 148$^a$ and 149$^a$, the hammer 147' is moved around to the left with the shaft 119 until the lug 149$^b$ extending toward the observer from the plate 149' engages the spring dog 150' pivoted to the frame of the machine at 151. The hammer 147' is retained in this position until the lever 10 is moved upward after its full stroke a sufficient amount to bring the lug 148$^a$ into engagement with the dog 150' and force it out of engagement with the lug 149$^b$, at which time, under the action of the spring 150, the hammer 147' is rotated around to the right upon the shaft 119 to strike the gong 98. In this manner, it will be observed a characteristic sound is produced, consisting of two strokes of the gong 98, when a coin or token corresponding to a plurality of fares or admission fees is registered.

In order to prevent too rapid return of the rack bar 18 from its depressed to its normal position, and thus to prevent confusion of the two strokes given the gong 98 by the actuation of such rack bar, the mechanism shown in Fig. 21 is employed. This consists of a spring pawl 18$^f$ pivoted at 18$^g$ to the rack bar 18. The spring normally holds the pawl 18$^f$ against the stop 18$^h$, and in this position on its upward motion it engages the upper end of the escapement dog 150' pivoted at 151', as a result of which engagement, the lower end of the escapement dog is moved into the path of a shoulder 18$^k$ formed on the rack bar 18. If the rack bar at this time is moving slowly in an upward direction the pawl 18$^f$ becomes disengaged from the escapement dog before the lower end of such dog engages the shoulder 18$^k$ and a spring 152 moves such dog out of the path of the shoulder 18$^k$. If, however, the rack bar 18 is moved rapidly in an upward direction the shoulder 18$^k$ engages the lower end of the escapement dog 150 before such dog has opportunity to move out of the path of the shoulder and thus it is impossible for the rack bar 18 to move upward with sufficient rapidity to bring the two strokes of the gong 98 sufficiently close together to cause confusion.

The shaft 87 has secured to its lower end a bevel gear 153 meshing with a similar bevel gear 154 secured to the right hand end of a shaft 155, as seen in Fig. 4, to the other end of which shaft a gear 156 is secured. The gear 156 meshes with a gear 157 secured to the right-hand end of a shaft 158 to the other end of which a gear 159 is secured. The gear 159 meshes with a gear 160 adapted to operate the recording mechanism shown in Figs. 22 and 23. The gearing and shafts just referred to are shown in plan view in Fig. 24, from which it will be understood that the operation of the resetting mechanism in returning the temporary register 5 to its zero indication will turn the gear 160 through a complete rotation and thus cause actuation of the recording mechanism.

As shown in Figs. 22 and 23, the recording mechanism is contained in a casing 161 disposed at the left hand end of the registering mechanism and in this casing 161 a supply roll of paper 162 is pivotally supported at 163. Paper from the roll 162 is led over a guide roll 164 and from thence between feeding rollers 165 and 166. The feeding roll 166 has secured thereto a gear 167 which meshes with a gear 168. The gear 168 has rigidly secured to it the ratchet wheel 169 adapted to be engaged by a spring pawl 170 pivoted to a lever 171 at 172. The lever 171 is pivotally supported from the casing 161 by means of the shaft 173 to which two horizontally extending arms 174 are secured. As shown in Fig. 23, the arms 174 are joined at their right-hand ends by means of a bar 175 disposed over the printing points of the type wheels 176. The type wheels 176 are constructed in a manner similar to the wheels of the totalizing register 60, the difference being that raised figures are provided upon them to print the reading at any instant upon the strips of paper above referred to and the units wheel of these type wheels is driven by means of a gear 177 secured thereto which gear meshes with an idler 178 driven by a gear 179 secured to the end of the shaft 56 which is extended from the registering mechanism for the purpose of driving the type wheels. In this manner the reading of the type wheels is always caused to correspond with the reading of the wheels of the totalizing register 60.

The paper wound upon the roll 162 consists of a plurality of strips wound together, such strips being carbon faced so that a plurality of records is made when the arms 174 are raised by means of the lever 171 and released so that a spring 180 may force the strips of paper against the type wheels by means of the bar 175. The lower end of the lever 171 lies in the path of a cam 181 carried by the gear 160, as a result of which when the gear 160 is rotated, due to the resetting of the temporary register 5, the lever 171 is moved around to the left and the arms 174 are raised against the action of the spring 180 and at the same time the strips of paper are advanced by means of the spring pawl 170. When the cam 181 has passed beyond the lower end of the lever 171, the spring 180 forcibly rotates the shaft 173 and parts carried thereby and brings the bar 175 into engagement with the strips of paper and the type wheels 176. After the records thus made pass the feed rolls 165 and 166, they pass down through two separate tubes 182 and 183 into suitable receptacles 184 and 185 respectively. Access may be had to the tube 183 by the attendant by opening the door 186 pivotally mounted in the casing 161 at 187. The opening of the door 186 rotates cams 188, as more clearly shown in Fig. 25 secured to the upper end of the door 186 which cams engage a cutting bar 189 pivoted to the casing 161 at 190 and cause the cutting bar to move into engagement with the outer record 191 and press it against the roller 192 thus insuring that it may be removed by the operator in a proper manner, and that no additional paper may be taken from the recording mechanism. An inner door 193 pivotally secured to the roller 192 is provided which may only be opened by one having a proper key, as, for example, the duly authorized inspector, who, by opening the door 193 rotates the roller 192 and brings the cutting edge 194 into engagement with the inner record 195 thus permitting its removal from the recording mechanism. It is to be noticed that the door 193 cannot be opened unless the door 186 is open and that the opening of the door 186 feeds the records into a position to be removed from the recording mechanism as follows. The upper end of the door 186 has rigidly secured to it a sector 196 which meshes with a gear 197 which gear meshes in turn with a gear 198. The gear 198 carries a spring pawl 199 which engages a ratchet wheel 200 rigidly secured to the gear 168. As a result of this construction when the door 186 is raised, the gears 196, 197 and 198 and the pawl 199 and ratchet wheel 200 coöperate to rotate the gear 168 and therefore the gear 167 and the feed rolls 165 and 166. It is to be noticed that the motion imparted to the feed rolls 165 and 166 is multiplied in order that a sufficient length of record may be fed into the tubes 182 and 183 to give the attendant or inspector complete records including the last one made. The pawl 199 and ratchet wheel 200 are provided in order that the step by step advance of the record strips caused at each operation of recording by the pawl 170 may not drive the gearing connected with the sector 196 and therefore move the door 186 from its vertical position.

From the above description it is evident that the coin-sorting and registering-mechanism may be employed for any desired value of coins and furthermore that such mechanism may have a capacity for a greater number of different coins without departing from the spirit of my invention.

From the above it will appear that my invention is applicable to coin-sorting devices broadly; that it is also applicable to devices intended to register or count coins or tokens of one or more denominations; that it is adapted to receive coins or tokens of one value, to register a part of that value and deliver to the one depositing the coin or token the difference; that it is adapted for use in connection with operating a resettable or temporary register by means of a plurality of operating devices, which operating devices have different values of operation whether a permanent or totalizing register be employed in connection with the temporary register or not; and that the registrations effected by the mechanisms may be recorded or not as desired.

While I have shown my invention in the particular embodiments herein described, I do not, however, limit myself to these constructions, but desire to claim any equivalents that will suggest themselves to those skilled in the art.

I claim—

1. In a coin or token registering machine, the combination of a temporary register, a totalizing register, normally locked operating mechanisms one of which is adapted to operate both of such registers an amount differing in value from the actuation of such registers effected by the other operating mechanisms, such operating mechanisms being unlocked by the deposit of coins or tokens of corresponding value, and means for preventing the simultaneous actuation of two or more of such operating mechanisms.

2. In a coin or token registering machine, the combination of a temporary register, a totalizing register, a normally locked operating mechanism for actuating both of such registers, such operating mechanism being unlocked by deposit of a predetermined coin or token to allow actuation thereof to advance such registers an amount corresponding to the value of such coin or token, and means for delivering such deposited coin or token to the operator upon actuation of such operating mechanism.

3. In a coin or token registering machine, the combination of a temporary register, a totalizing register, a normally locked operating mechanism for actuating both of such registers, such operating mechanism being released by the deposit of a predetermined coin or token to allow actuation thereof to advance such registers an amount corresponding to the value of such coin or token, and means independent of said coin released mechanism, for preventing actuation of such operating mechanism to actuate either register during a resetting operation of the temporary register.

4. In a coin or token registering machine, the combination of a temporary register, a totalizing register, a normally locked operating mechanism for actuating both of such registers, such operating mechanism being released by the deposit of a predetermined coin or token to advance such registers an amount corresponding to the value of such coin or token deposited, and means independent of said coin released mechanism, for preventing actuation of such operating mechanism during a resetting operation and for preventing the resetting of the temporary register during actuation of the operating mechanism.

5. In an admission register, the combination of a registering mechanism, a coin or token-controlled operating mechanism for operating such registering mechanism, and a second operating mechanism operable independently of the coin or token-controlled operating mechanism and adapted to also operate said registering mechanism.

6. In an admission register, the combination of a registering mechanism, a coin or token-controlled operating mechanism for operating such registering mechanism, a ticket registering mechanism operable independently of the coin or token-controlled operating mechanism, and a common registering mechanism adapted to be operated in the same direction by either the coin-controlled operating mechanism or ticket-registering mechanism when actuated.

7. In an admission register, the combination of a coin or token-controlled registering mechanism, ticket register mechanism, and a common register adapted to be operated in the same direction by the actuation of either of such mechanisms.

8. In an admission register, the combination of a plurality of operating mechanisms each controlled by a coin or token of a value different from the coins or tokens controlling the remaining operating mechanisms, a registering mechanism adapted to be operated by any one of such operating mechanisms when actuated, another operating mechanism free from coin or token-control adapted to also operate such registering mechanism, a totalizing register adapted to be operated by the coin or token-controlled operating mechanisms, and a totalizing register adapted to be operated by the other operating mechanism.

9. In an admission register, the combination of a registering mechanism, a plurality of normally locked operating mechanisms, each adapted to be released by the insertion in the register of a coin or token of value different from that required to release the others of such operating mechanisms, such operating mechanisms when actuated adapted to advance the registering mechanism an amount corresponding to the value of the coins or tokens used to release them, another normally free operating mechanism also adapted to actuate such registering mechanism in the same direction, a totalizing register adapted to be operated by the coin or token-controlled operating mechanisms, and a totalizing register adapted to be operated by the other operating mechanism.

10. In an admission register, the combination of a registering mechanism, an operating mechanism for such registering mechanism, a receptacle for receiving the coin or token representing an admission fee, means for normally locking such operating mechanism against actuation, means operated by the coin or token adapted for releasing such locking mechanism, a second operating mechanism adapted to be actuated independently of the deposit of a coin or token, such second operating mechanism also adapted to operate such registering mechanism, and change making mechanism adapted to deliver to the depositor the difference between a coin or token deposited and the admission fee registered by such registering mechanism.

11. In an admission register, the combination of a registering mechanism, a coin or token-controlled operating mechanism for operating such registering mechanism, a ticket registering mechanism operable independently of the coin or token-controlled operating mechanism a common register controlled by both said coin controlled mechanisms and said ticket registering mechanism, and change making mechanism adapted to deliver to the depositor the difference between a coin or token deposited and the admission fee registered by such registering mechanism.

12. In a coin or token register, the combination of a registering mechanism, for registering the number of coins deposited, a normally locked manually operated mechanism for actuating such registering mechanism, such operating mechanism being released by the deposit of a coin or token to become operable to advance the registering mechanism an amount less than the value of such coin or token, a removable change holder, and change making devices adapted to deliver from such change holder the difference between the value of the coin or token deposited and the amount registered, the removal of such change holder from the register serving to prevent actuation of the change making devices.

13. In a coin or token register, the combination of a registering mechanism, for registering the coins deposited, a plurality of normally locked operating mechanisms adapted to advance such registering mechanism different values, said mechanisms including manually operated levers, a locking mechanism associated with one or more of such operating mechanisms for normally preventing the operation thereof, such locking mechanism releasable by the insertion in the register of a coin or token greater than the value of the advance effected on the register by the corresponding operating mechanism, a removable change holder, and change making devices adapted to deliver from such change holder the difference between the coin or token deposited and the amount registered, the removal of such change holder from the register serving to prevent actuation of the change making devices.

14. In an admission register, the combination of a registering mechanism, an operating mechanism for such registering mechanism, a receptacle for receiving the coin or token representing an admission fee, means for normally locking such operating mechanism against actuation, means operated by the coin or token adapted for releasing such locking mechanism, a second operating mechanism adapted to be actuated independently of the deposit of a coin or token, such second operating mechanism also adapted to actuate such registering mechanism, a removable change holder, and change making devices adapted to deliver from such change holder the difference between the coin or token deposited and the amount registered, the removal of such change holder from the register serving to prevent actuation of the change making devices.

15. In an admission register, the combination of a registering mechanism, a coin or token-controlled operating mechanism for operating such registering mechanism, a ticket registering mechanism operable independently of the coin or token-controlled operating mechanism, a temporary register operable by both said coin controlled mechanisms and said ticket registering mechanism, a removable change holder, and change making devices adapted to deliver from such change holder the difference between the coin or token deposited and the amount registered, the removal of such change holder from the register serving to prevent actuation of the change making devices.

16. In an admission register, the combination of a registering mechanism, an operating mechanism for such registering mechanism, a receptacle for receiving the coin or token representing an admission fee, means for normally locking such operating mechanisms against actuation, means operated by the coin or token adapted for releasing such locking mechanism, a second operating mechanism adapted to be actuated independently of the deposit of a coin or token, such second operating mechanism also adapted to operate such registering mechanism, change making mechanism adapted to deliver to the depositor the difference between a coin or token deposited and the admission fee registered by such registering mechanism, and means for recording at intervals the amounts registered.

17. In registering mechanism, the combination of an indicating register, a gong, coin controlled manually operated actuating means for actuating said register different predetermined amounts, and means operated by the said actuating means for striking said gong in a characteristic manner corresponding to the different degrees of actuation of the register.

18. In a coin or token register, the combination of a registering mechanism, a plurality of operating mechanisms for such registering mechanism, such operating mechanisms being controlled only by coins or tokens of corresponding value to advance the registering mechanism amounts corresponding to such value, a gong, striking devices associated with each operating mechanism adapted when operated to strike the gong a characteristic number of times, and retarding mechanism adapted to prevent undue acceleration of the striking devices to prevent thereby confusion of the gong strokes.

19. In an admission register, the combination of a registering mechanism, an operating mechanism for such registering mechanism, a receptacle for receiving the coin or token representing an admission fee, means for normally locking such operating mechanism against actuation, means operated by the coin or token adapted for releasing such locking mechanism, a second operating mechanism adapted to be actuated independently of the deposit of a coin or token, such second operating mechanism also adapted to actuate such registering mechanism in the same direction, and an attendant's receptacle for receiving the coins or tokens deposited, such attendant's receptacle having a movable portion adapted to deposit such coins or tokens in the hand used to actuate such movable portion.

20. In an admission register, the combination of a registering mechanism, a coin or token controlled operating mechanism for operating such registering mechanism, a ticket registering mechanism operable independently of the coin or token controlled operating mechanism for operating said registering mechanism in the same direction, and an attendant's receptacle for receiving the coins or tokens deposited, such attendant's receptacle having a movable portion adapted to deposit such coins or tokens in the hand used to actuate such movable portion.

21. In an admission register, the combination of a registering mechanism, an operating mechanism for such registering mechanism, a receptacle for receiving the coin or token representing an admission fee, means for normally locking such operating mechanism against actuation, means operated by the coin or token adapted for releasing such locking mechanism, a second operating mechanism adapted to be actuated independently of the deposit of a coin or token, such second operating mechanism also adapted to actuate such registering mechanism in the same direction, and means for recording the amounts registered.

22. In an admission register, the combination of a registering mechanism, a coin or token controlled operating mechanism for operating such registering mechanism, a ticket registering mechanism operable independently of the coin or token controlled operating mechanism for operating said registering mechanism in the same direction, and means for recording the amounts registered.

23. In an admission register, the combination of a registering mechanism, a plurality of normally locked operating mechanisms, each adapted to be released by the insertion in the register of a coin or token of value different from that required to release the others of such operating mechanisms, such operating mechanisms when actuated adapted to advance the registering mechanism an amount corresponding to the value of the coins or tokens used to release them, another normally free operating mechanism also adapted to actuate such registering mechanism in the same direction, and means for recording the amounts registered.

24. In an admission register, the combination of a registering mechanism, a plurality of normally locked operating mechanisms, each adapted to be released by the insertion in the register of a coin or token of value different from that required to release the others of such operating mechanisms, such operating mechanisms when actuated adapted to advance the registering mechanism an amount corresponding to the value of the coins or tokens used to release them, another normally free operating mechanism also adapted to actuate such registering mechanism in the same direction, a totalizing register adapted to be operated by the coin or token controlled operating means, a totalizing register adapted to be operated by the other operating mechanism, and means for recording the amounts registered.

25. In a coin or token register, the combination of registering wheels, a plurality of operating keys one for each kind of coin to be registered, a rack bar operated by each key, normally disconnected gearing between each rack bar and the registering wheels, operation of any key serving to engage the corresponding gearing and rack bar and advance the registering wheels the amount of the corresponding coin, a coin receptacle for each of the kinds of coins to be registered, and a lock associated with each receptacle for normally preventing operation of the corresponding key, insertion of a proper coin into one of the receptacles serving to release the corresponding key.

26. In an admission register, the combination of coin registering wheels, a first operating key, gearing between such key and such wheels, ticket registering wheels, a second operating key, gearing between the second key and the ticket registering wheels, and locking mechanism for normally preventing operation of such first key, insertion of an admission coin serving to actuate the locking mechanism to release such first key, temporary register wheels operatively connected to both keys, such second key being normally operable regardless of the insertion of a coin.

27. In combination, coin-receiving and coin-counting mechanisms, a register for indicating the operation of said coin-counting mechanism, a casing surrounding said coin-counting mechanism, a casing having a transparent portion surrounding said register, a tubular column joining said casing and forming a support for said register, and a mechanical connection extending through said column for connecting said coin-counting mechanism and said register, said column and casing forming a continuous cover about said mechanism.

28. In a coin or token register, the combination of a registering mechanism, a coin or token controlled operating mechanism for such registering mechanism, a ticket registering mechanism not controlled by coins or tokens and adapted to also operate said registering mechanism and indicators for indicating the character or value of the last registration.

29. In a coin or token register, the combination of a coin or token controlled registering mechanism, a separate registering mechanism not so controlled and adapted to also operate said registering mechanism and indicators for indicating the kind or value of the last registration.

30. In combination, a coin receiving mechanism, a fare register, a tubular column extending between the coin receiving mechanism and the fare register to serve as a support for said register, operating devices extending from said mechanism through said column to said register, said devices being inclosed and protected by said column, and locking mechanism normally preventing operation of the operating devices, said locking devices being rendered inoperative by depositing a coin in said coin receiving mechanism.

31. In combination, a coin receiving mechanism, a fare register, a column extending between the coin receiving mechanism and the fare register to serve as a support for said register, operating devices extending from said mechanism through said column to said register, means for resetting said fare register, a totalizing register, and means for actuating said coin receiving mechanism and said registers an amount determined by a deposited coin.

32. In combination, a coin receiving mechanism, a fare register, a column extending between the coin receiving mechanism and the fare register to serve as a support for said register, operating devices extending from said mechanism through said column to said register, means for resetting said fare register as desired, a totalizing register, and locking devices for normally preventing operation of the coin receiving mechanism and said registers, said locking devices being rendered inoperative by the deposit of a coin in the coin receiving mechanism.

33. In combination, a temporary register and a permanent register, operating mechanism for advancing the registers an amount determined by a deposited coin and by the same operation delivering said coin to the operator, and means for resetting the temporary register and means for indicating the value of the last advance of the registers.

34. In combination, a temporary register and a permanent register, operating mechanism for advancing the registers an amount determined by a deposited coin and by the same operation delivering said coin to the operator, resetting means for the temporary register, and interlocking mechanism between said operating mechanism and said resetting means for preventing actuation of the operating mechanism during a resetting operation.

35. In combination, a temporary register and a permanent register, operating mechanism for advancing the registers an amount determined by a deposited coin and by the same operation delivering said coin to the operator, and interlocking mechanism between said operating mechanism and said resetting means for preventing actuation of the operating mechanism during a resetting operation and for preventing a resetting operation during an actuation of the operating mechanism.

36. In combination, a temporary register and a permanent register, operating mechanism for advancing the registers an amount determined by a deposited coin and by the same operation delivering said coin to the operator, means for resetting the temporary register, and interlocking mechanism between the operating mechanism and the resetting means for preventing an actuation of the operating mechanism during a resetting operation.

37. In combination, a temporary register and a permanent register, operating mechanism for advancing the registers an amount determined by a deposited coin and by the same operation delivering said coin to the operator, means for resetting the temporary register, and means for indicating the value of the last advance of the registers, and devices for compelling a full cycle of operation when an actuation of the operating mechanism has been begun.

38. In combination, a casing, a coin passageway extending through the casing, a coin receiving hopper at the upper end of the passageway, a delivering pan at the lower end of the passageway, operating mechanism in the coin casing, coin controlled devices in the passageway for determining the actuation of the operating mechanism, and a fare register actuated by the operating mechanism, and a column connected to said casing and supporting the fare register above the casing.

39. In combination, a casing, a fare-register supported by and above said casing, a coin passageway extending through the casing, a coin receiving hopper at the upper end of the passageway, a delivering pan at the lower end of the passageway, operating mechanism in the casing, coin controlled devices in the passageway for determining the actuation of the operating mechanism, an actuating connection between said fare-register and said operating mechanism, means for resetting the fare register as desired, and interlocking mechanism between the operating mechanism and the fare register for preventing actuation of the operating mechanism during a resetting operation.

40. In combination, a casing, a fare register supported by and above said casing, a coin passageway extending through the casing, a coin receiving hopper at the upper end of the passageway, a delivering pan at the lower end of the passageway, operating mechanism in the casing, coin controlled devices in the passageway for determining the actuation of the operating mechanism, an actuating connection between said fare-register and said operating mechanism, means for resetting the fare register as desired, and interlocking mechanism between the operating mechanism and the fare register for preventing actuation of the operating mechanism during a resetting operation and for preventing a resetting operation during an actuation of the operating mechanism.

41. In combination, a casing, a coin passageway extending through the casing, a coin receiving hopper at the upper end of the passageway, a delivering pan at the lower end of the passageway, operating mechanism in the casing, coin controlled devices in the passageway for determining the actuation of the operating mechanism, and a fare register actuated by the operating mechanism, an actuating connection between said fare register and said operating-mechanism, means for resetting the fare register as desired, and an interlocking mechanism between the operating mechanism and the fare register for preventing a resetting operation during an actuation of the operating mechanism.

42. In combination, a casing, a coin passageway extending through the casing, a coin receiving hopper at the upper end of the passageway, operating mechanism in the casing, coin controlled devices in the passageway for determining the actuation of the operating mechanism, and a fare register actuated by the operating mechanism, and devices for compelling a complete cycle of operation after an actuation of the operating mechanism has been begun.

43. In a register, the combination of a temporary register, a totalizing register, manual means for simultaneously operating both registers, coin or token controlled locking mechanism for normally locking said manual means, said locking means being releasable by deposit of a suitable coin or token, means for resetting the temporary register, and a direction indicator actuated by said resetting means.

44. In a fare-register, the combination of a temporary register, a totalizing register, normally inoperable connected coin-controlled operating-mechanism for both of said registers, said mechanism being rendered operable by deposit of a coin therein, and means for resetting said temporary register.

45. In a coin-register, the combination of a temporary register, a totalizing register, normally inoperable coin-controlled operating-mechanisms for both of such registers, said mechanism being rendered operable by deposit of a coin therein, means for resetting said temporary register, and a change-making mechanism for delivering the proper change for the coin deposited.

46. In a coin-register, the combination of means for sorting coins deposited in the machine a temporary register, a totalizing register, a normally inoperable, coin controlled operating mechanism for both of said registers, said mechanism being rendered operable by the sorting of a suitable coin by said sorting-mechanism, and means for resetting such temporary register.

47. In combination, a plurality of normally-inoperable, coin-enabled operating devices, said operating devices being for coins of different denominations, sorting mechanism for directing coins of proper denomination to the corresponding operating devices to render the same operable, a trip register, and an accumulating register connected to said operating means.

48. In combination, a totalizing register, a temporary register, a plurality of normally inoperable coin-enabled means for operating said registers, other means not coin-enabled for operating said registers, and means for indicating the last actuated operating means.

49. In combination, a totalizing register, a temporary register, a plurality of normally-locked coin controlled means for operating said registers, other means not coin-controlled for operating said registers, and means for indicating the last actuated operating means.

50. In combination, a coin-hopper, coin-measuring mechanism for receiving coins from said hopper, a casing surrounding said mechanism and forming a support for said coin-hopper, an overhead register actuated by said coin-measuring means, a tubular column connected to said casing and supporting said overhead register, and an operating connection for said register extending through and inclosed by said column, said column and casing forming a continuous protection for said operating parts.

51. In combination, an overhead register having resetting means, a casing surrounding said overhead register, a coin-hopper, coin-measuring mechanism, a casing surrounding said mechanism, a tubular column forming a continuation of said last named casing, and of said register casing, and an operative connection from said measuring mechanism to said register extending through said tubular column, and an operating handle for said measuring mechanism extending through the casing surrounding said mechanism.

In witness whereof, I hereunto subscribe my name this 10th day of February, A. D. 1910.

WILLIAM G. KIRCHHOFF.

Witnesses:
HENRY M. HUXLEY,
LENA E. HANNEN.